(12) United States Patent
Kuroda (10) Patent No.: US 9,440,681 B2
(45) Date of Patent: Sep. 13, 2016

(54) CABIN SPACE STRUCTURE FOR ALL TERRAIN VEHICLE

(71) Applicant: HONDA MOTOR CO., LTD., Tokyo (JP)

(72) Inventor: Kosuke Kuroda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 14/225,508

(22) Filed: Mar. 26, 2014

(65) Prior Publication Data

US 2014/0292036 A1 Oct. 2, 2014

(30) Foreign Application Priority Data

Mar. 29, 2013 (JP) ................................. 2013-075168

(51) Int. Cl.
*B60K 37/00* (2006.01)
*B62D 25/14* (2006.01)
*B60N 2/005* (2006.01)
*B62D 23/00* (2006.01)

(52) U.S. Cl.
CPC ............... *B62D 25/14* (2013.01); *B60N 2/005* (2013.01); *B62D 23/005* (2013.01)

(58) Field of Classification Search
CPC .... B60H 1/0055; B60K 37/00; B60N 2/005; B62D 23/005; B62D 25/14
See application file for complete search history.

(56) References Cited

U.S. PATENT DOCUMENTS

| | | | | |
|---|---|---|---|---|
| 3,791,667 A * | 2/1974 | Haviland | ................ | B60R 21/20 280/730.2 |
| 4,317,582 A * | 3/1982 | Cottin et al. | ........... | B62D 25/14 180/90 |
| 6,364,394 B1 * | 4/2002 | Davis, Jr. | ............... | B60K 37/00 296/203.01 |
| 8,556,324 B1 * | 10/2013 | Yamamoto | ............... | B60N 2/02 280/801.1 |
| 8,752,879 B1 * | 6/2014 | Heit | ........................ | B60P 3/423 296/39.1 |
| 8,764,103 B2 * | 7/2014 | Toba | ...................... | B62D 21/02 296/187.09 |
| 2007/0236037 A1 * | 10/2007 | Kobayashi | ............... | B60N 3/06 296/37.8 |
| 2008/0203753 A1 * | 8/2008 | Klein | ..................... | B60N 2/005 296/65.13 |
| 2009/0184541 A1 * | 7/2009 | Yamamura | ............. | B60N 2/005 296/190.08 |
| 2010/0019539 A1 | 1/2010 | Nakamura et al. | | |
| 2010/0139435 A1 * | 6/2010 | Inagaki | ................... | F16H 59/02 74/473.3 |

(Continued)

FOREIGN PATENT DOCUMENTS

| | | | | |
|---|---|---|---|---|
| DE | 102006055815 A1 * | 5/2008 | ............. | B60N 2/005 |
| DE | 102012018777 A1 * | 4/2014 | ........... | B60H 1/0055 |

(Continued)

*Primary Examiner* — Glenn Dayoan
*Assistant Examiner* — Paul Chenevert
(74) *Attorney, Agent, or Firm* — Birch, Stewart, Kolasch & Birch, LLP (57) ABSTRACT

A cabin space structure for an all terrain vehicle that enables optimization of the shape of a dashboard in the case where seats are so arranged that three persons can be seated side by side in the vehicle width direction. The cabin space structure includes seats on which three passengers are seated side by side in the vehicle width direction, a step floor on which the passengers seated on the seats place their feet, wheel wells for left and right front wheels, the wheel wells provided to project rearwardly at a left-side portion and a right-side portion of the step floor and the dashboard disposed forwardly of the seats. The dashboard is adapted to restrict forward movement of the passengers seated on the seats. A left-side portion and a right-side portion of the dashboard are disposed on the rear side relative to a vehicle-width-directionally central portion of the dashboard.

11 Claims, 5 Drawing Sheets

(56) References Cited

U.S. PATENT DOCUMENTS

| | | | |
|---|---|---|---|
| 2014/0224561 A1* | 8/2014 | Shinbori | B60G 3/20 180/253 |
| 2014/0262583 A1* | 9/2014 | Url | B62D 63/025 180/233 |
| 2015/0047917 A1* | 2/2015 | Burt, II | B60J 10/08 180/292 |
| 2015/0274212 A1* | 10/2015 | Karube | B62D 25/12 296/193.11 |

FOREIGN PATENT DOCUMENTS

| | | | | |
|---|---|---|---|---|
| FR | 1543249 A | * | 10/1968 | B60N 2/005 |
| FR | 2842471 A1 | * | 1/2004 | B60K 37/00 |
| FR | 2942610 A1 | * | 9/2010 | B62D 23/005 |
| GB | 1012559 A | * | 12/1965 | B60N 2/01 |

* cited by examiner

FIG. 5

CABIN SPACE STRUCTURE FOR ALL TERRAIN VEHICLE

CROSS-REFERENCE TO RELATED APPLICATIONS

The present application claims priority under 35 USC 119 to Japanese Patent Application No. 2013-075168 filed Mar. 29, 2013 the entire contents of which are hereby incorporated by reference.

BACKGROUND OF THE INVENTION

1. Field of the Invention

The present invention relates to a cabin space structure for an all terrain vehicle.

2. Description of Background Art

A structure is known wherein a plurality of seats are arranged side by side in the vehicle width direction of an all terrain vehicle with a dashboard being disposed forwardly of the seats. See, for example, U.S. Patent Application Publication No. 2010/0019539.

However, in the case where seats are arranged so that three persons can be seated side by side in the vehicle width direction, the shape of the dashboard should be optimized.

SUMMARY AND OBJECTS OF THE INVENTION

It is an object of an embodiment of the present invention to provide a cabin space structure for an all terrain vehicle that enables optimization of the shape of a dashboard in the case where seats are arranged so that three people can be seated side by side in the vehicle width direction.

According to an embodiment of the present invention, a configuration (cabin space structure) is provided for an all terrain vehicle having left and right front wheels and seats for seating passengers thereon with the seats disposed rearwardly of the front wheels. The configuration includes seats on which three passengers are seated side by side in the vehicle width direction, a step floor on which the seated passengers put their feet, wheel wells for the left and right front wheels, the wheel wells provided to project rearwardly at a left-side portion and a right-side portion of the step floor and a dashboard disposed forwardly of the seats. The dashboard is adapted to restrict forward movements of the passengers seated on the seats. A left-side portion and a right-side portion of the dashboard are disposed on the rear side relative to a vehicle-width-directionally central portion of the dashboard.

According to an embodiment of the present invention, the left-side portion and the right-side portion of the dashboard are disposed on the rear side relative to rear portions of the wheel wells.

According to an embodiment of the present invention, a central floor of the step floor that corresponds to a center seat located in a vehicle-width-directional center, of the seats, is disposed to be higher than left and right floors of the step floor. The central floor is provided with an intake passage. In addition, the center seat is disposed to be higher than left and right seats of the seats.

According to an embodiment of the present invention, the configuration (cabin space structure) further includes a pedal for a driving operation. The pedal is disposed between the wheel well and the central floor of the step floor, on a lateral side of the wheel well.

According to an embodiment of the present invention, a storage box with an open/close lid is provided at the left-side portion or the right-side portion of the dashboard.

According to an embodiment of the present invention, it is possible to optimize the shape of the dashboard in the case where the seats are arranged so that three persons can be seated side by side in the vehicle width direction. More particularly, it is possible to restrain forward falling of the upper parts of the bodies of the passengers seated on the left seat and the right seat where the places for positioning the passengers' feet are obstructed by the left wheel well and the right wheel well. This ensures that even in the condition where these passengers cannot bring their feet forward, the passengers can be maintained in such a posture wherein their upper bodies also are restrained from moving or falling forward. Consequently, a comfortable ride can be realized.

According to an embodiment of the present invention, forward falling of the upper bodies of the passengers seated on the left seat and the right seat can be restrained more favorably. As a result, a better ride comfort can be secured.

According to an embodiment of the present invention, good comfort for the legs of the passenger seated on the center seat can be realized, while securing the space for the intake passage. In addition, in a two-passenger mode wherein the passengers are seated only on the left seat and the right seat, a comfortable ride can be secured, since the left floor and the right floor are partitioned from each other by the central floor.

According to an embodiment of the present invention, the place on which to position the feet of the passenger (driver) seated on the driver's seat and the place on which to position the feet of the passenger seated on the center seat can be shifted from each other in the height direction. Consequently, it is possible to secure dwelling spaces for the legs of both of these passengers.

According to an embodiment of the present invention, a large-sized storage box can be provided at the left portion or the right portion disposed on the rear side relative to the central portion of the dashboard.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below, referring to the drawings.

As shown in FIGS. 1 to 5, an all terrain vehicle 1 provided with a cabin space structure according to an embodiment of the present invention includes a body frame 10, a left front wheel 21 and a right front wheel 22 disposed at front portions of the body frame 10, a left rear wheel 23 and a right rear wheel 24 disposed at rear portions of the body frame 10, a power unit 30 disposed in the center of the body frame 10, a front-row riding space 40 disposed forwardly of the power unit 30, a rear-row riding space 70 disposed rearwardly of the power unit 30 and a luggage carrier 90.

The body frame 10 includes a main frame 11, a front frame 12, a rear frame 13, and side frames 14. The main frame 11 extends in the longitudinal vehicle direction, along a lower portion of the vehicle 1, from the vicinity of the rear ends of the front wheels 21 and 22 to the vicinity of the rear ends of the rear wheels 23 and 24. In addition, the main frame 11 also extends over a predetermined range in the left-right direction (vehicle width direction). The power unit 30 is supported on the main frame 11. The front frame 12 is connected to the front end side of the main frame 11. The left front wheel 21 and the right front wheel 22 are supported on the front frame 12 in a steerable manner and in an independent-suspension state. A front cover 15 covering a front region of the vehicle 1 is supported on the front frame 12. A luggage room 15a is provided inside the front cover 15.

The rear frame 13 is integrally connected to the main frame 11, to be located higher than the main frame 11 by a predetermined height, through leg parts 13a rising from the main frame 11 on the rear end side of the main frame 11. The left rear wheel 23 and the right rear wheel 24 are supported on the rear frame 13 in an independent-suspension state. The side frames 14 are connected respectively to the left and right sides of the main frame 11. A left support part 16 for supporting a front-side hinge of a left front door 61 and a right support part 17 for supporting a front-side hinge of a right front door 62, which are to be described later, are supported on the side frames 14. A left wheel well 18 for the left front wheel 21 and a right wheel well 19 for the right front wheel 22, which are to be described later, are supported on the side frames 14. A roll-over protective structure (ROPS) 20 for securing safety of the passengers by covering the passengers' riding space is connected to the side frames 14. The roll-over protective structure 20 is indicated by solid lines in FIGS. 1 and 2, and by two-dot chain lines in FIGS. 3 to 5.

The power unit 30 is installed on the main frame at a position near the vehicle body's center substantially equidistant from all of the left front wheel 21, the right front wheel 22, the left rear wheel 23 and the right rear wheel 24. The power unit 30 includes an engine 31 and a transmission 32, and also includes various peripheral devices. The peripheral devices include front wheel drive train 33, rear wheel drive train 34, an intake duct 35, and an exhaust duct 36. The driving force of the engine 31 is transmitted from the engine 31 through the transmission 32 and the front wheel drive train 33 to the respective left front wheel 21 and right front wheel 22. Similarly, the driving force of the engine 31 is transmitted from the engine 31 through the transmission 32 and the rear wheel drive train 34 to the respective left rear wheel 23 and right rear wheels 24. As will be described later, the upper side and both the left and right sides of a zone at the rear of the power unit 30 are covered with a power unit cover 37, since they are located in the region of the rear-row riding space 70.

The front-row riding space 40 is supported mainly on the main frame 11 forwardly of the power unit 30. The front-row riding space 40 is defined by front-row seats 41 on which passengers in the front row are seated, a front-row step floor 46 on which the seated passengers put their feet, a dashboard 51 disposed forwardly of the front-row seats 41 and the left front door 61 as well as the right front door 62. The front-row riding space 40 contains driving operation members such as a steering wheel 63 and a pedal 64. The front-row riding space 40 also contains a storage box 56.

The front-row seats 41 include a left seat 42, a right seat 43 and a center seat 44, so that three passengers can be seated side by side in the vehicle width direction. The front-row seats 41 are supported on the main frame 11 on the front side of the power unit 30. More specifically, the engine 31 is disposed on the lower back side of the center seat 44 with the transmission 32 being disposed in a region ranging backward from the lower side of the center seat 44. Therefore, the longitudinal-directional position of the center seat 44 is determined based on the correlation thereof with the power unit 30. More specifically, it is difficult to dispose the center seat 44 on the rear side relative to the position determined by the power unit 30. In addition, a fuel tank 38 is disposed under the right seat 43.

The front-row step floor 46 includes a left floor 47 on which the passenger seated on the left seat 42 puts his/her feet, a right floor 48 on which the passenger seated on the right seat 43 puts his/her feet and a central floor 49 on which the passenger seated on the center seat 44 puts his/her feet. The front-row step floor 46 is supported on the main frame 11 on the front side of the front-row seats 41. On the left front side of the left floor 47, the left wheel well 18 for the left front wheel 21 projects rearwardly. Similarly, on the right front side of the right floor 48, the right wheel well 19 for the right front wheel 22 projects rearwardly. Therefore, the longitudinal-directional positions of the left seat 42 and the right seat 43 are determined taking into account the correlations thereof with the left wheel well 18 and the right wheel well 19. More specifically, it is difficult to dispose the left seat 42 on the front side relative to the position determined by the left wheel well 18. Similarly, it is difficult to dispose the right seat 43 on the front side relative to the position determined by the right wheel well 19.

In order to simultaneously provide the longitudinal-directional position of the center seat 44 that is determined based on its correlation with the power unit 30 and the longitudinal-directional positions of the left seat 42 and the right seat 43 that are determined based on their correlations with the left seat 42 and the right seat 43. The center seat 44 of the front-row seats 41 is arranged on the front side as compared with the left seat 42 and the right seat 43.

The engine 31 is disposed on the lower back side of the center seat 44. Therefore, the intake duct 35 extending from the front side of the vehicle 1 to the engine 31 is disposed under the central floor 49 of the front-row step floor 46. This results in that the level of the central floor 49 of the front-row step floor 46 is set higher than the level of the left floor 47 and the right floor 48. Thus, the front-row step floor 46 is divided into the left floor 47, the central floor 49 set above the left floor 47, and the right floor 48 set below the central floor 49.

In order to secure a required height between the seat surface of the center seat 44 and the central floor 49, the seat surface of the center seat 44 of the front-row seats 41 is set above the seat surfaces of the left seat 42 and the right seat 43.

The dashboard 51 is disposed forwardly of the front-row seats 41, so as to restrict forward movements of the passengers. The dashboard 51 is supported by the front frame 12. The dashboard 51 is divided into a left portion 52 disposed forwardly of the left seat 42 of the front-row seats 41, a right portion 53 disposed forwardly of the right seat 43, and a central portion 54 disposed forwardly of the center seat 44. As above-mentioned, the center seat 44 of the front-row seats 41 is arranged on the front side as compared with the left seat 42 and the right seat 43. Correspondingly to this arrangement, the central portion 54 of the dashboard 51 is disposed on the front side (as viewed from the passengers) as compared with the left portion 52 and the right portion 53. In other words, the spacing from the passengers seated on the left seat 42 and the right seat 43 of the front-row seats 41 to the left portion 52 and the right portion 53 of the dashboard 51 is substantially equal to the spacing from the passenger seated on the center seat 44 of the front-row seats 41 to the central portion 54 of the dashboard 51.

A rear end portion of the left portion 52 and a rear portion of the right portion 53, of the dashboard 51, are located on the rear side in relation to a rear end portion of the left wheel well 18 and a rear end portion of the right wheel well 19. The right portion (the side where the steering wheel is absent) 53 of the dashboard 51 is provided with a lid 55 which can be opened toward the passenger's side and can be closed. A storage box 56 is provided an internal space closed with the lid 55.

The left front door 61 and the right front door 62 are supported while being hinged on the front side to the left support part 16 and the right support part 17 of the side frames 14, respectively. The left front door 61 and the right front door 62 cover the left side and the right side of the front-row riding space 40. The steering wheel 63 is disposed forwardly of the left seat (driver's seat) 42 of the front-row seats 41, in the state of being supported by the front frame 12. The pedal 64 is disposed between the left wheel well 18 of the left floor (driver's seat floor) 47 of the front-row step floor 43 and the central floor 49, in the state of being supported by the front frame 12.

The rear-row riding space 70 is supported mainly on the rear frame 13, rearwardly of the power unit 30. The rear-row riding space 70 is defined by rear seats 71 on which the passengers in the rear row are seated, a rear-row step floor 76 on which the seated passengers place their feet and a left rear door 81 as well as a right rear door 82. A left back plate 74 and a right back plate 75 of the rear-row seats 71, which plates will be described later, are of a reclining type. When in an erected state, these back plates are utilized as backrests for the passengers seated on the rear-row seats 71, when reclined flat, these back plates are utilized as floor boards of the luggage carrier 90.

Figure 1:
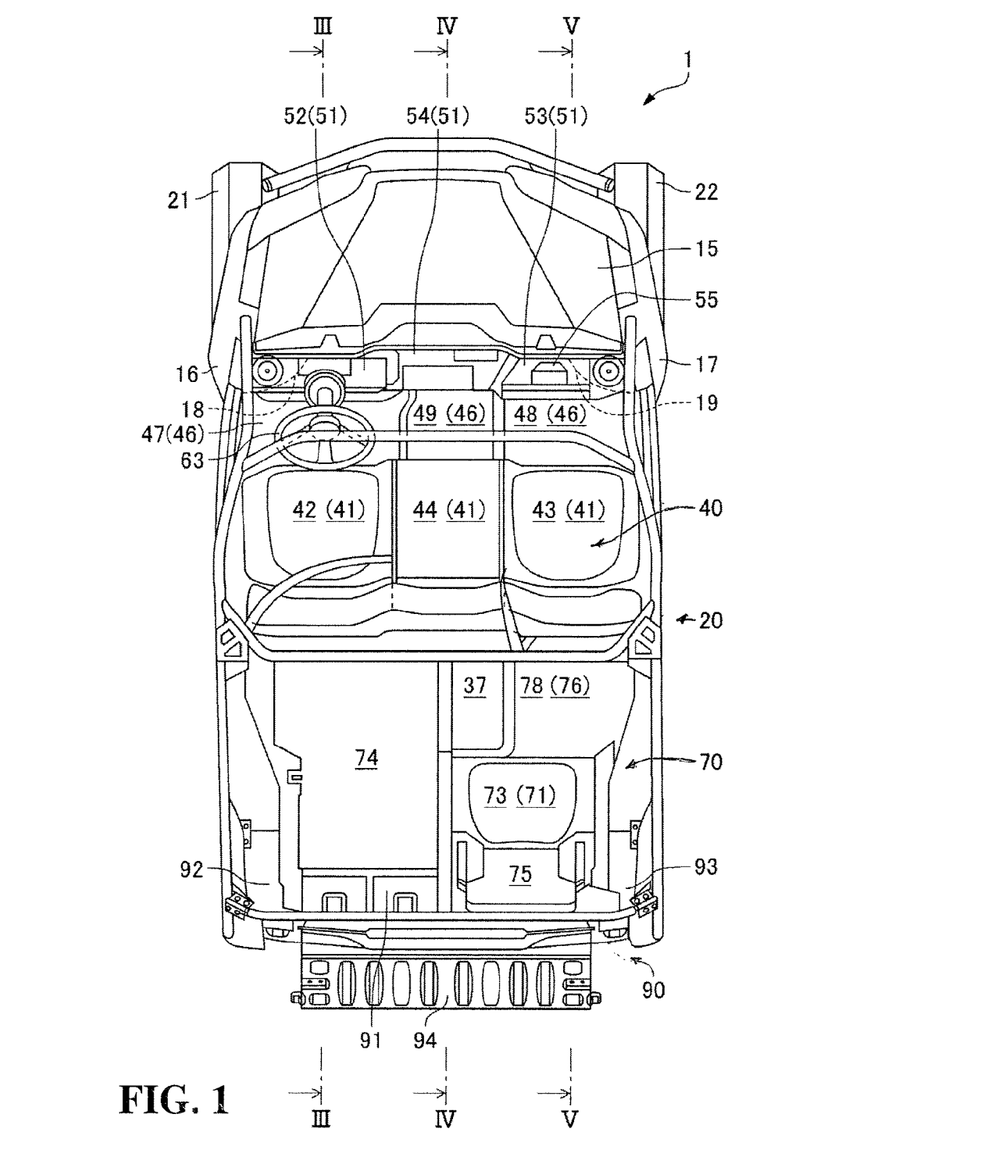
FIG. 1 is a plan view of an all terrain vehicle provided with a cabin space structure according to an embodiment of the present invention.
Figure 2:
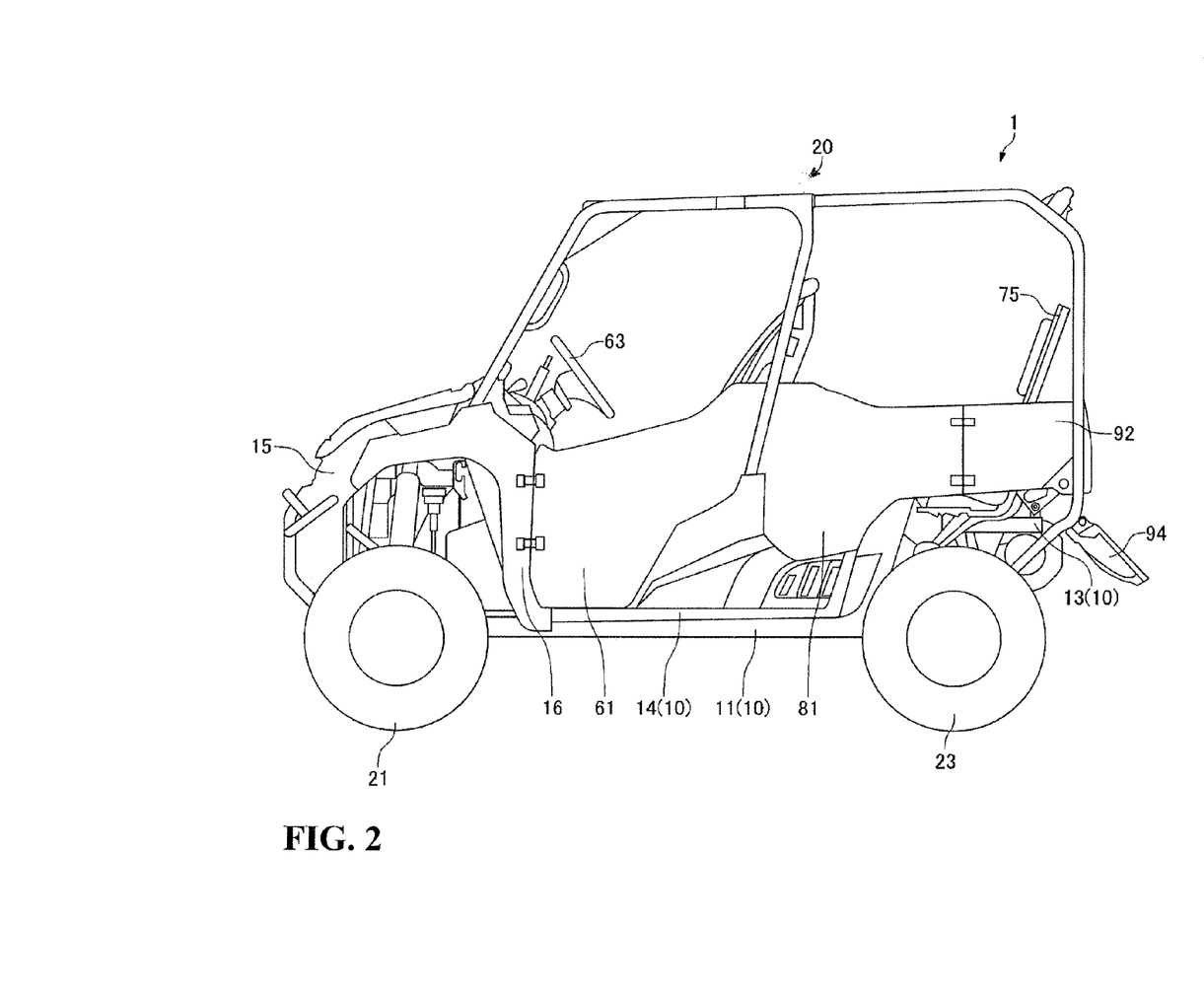
FIG. 2 is a schematic side view of the all terrain vehicle shown in FIG. 1.
Figure 3:
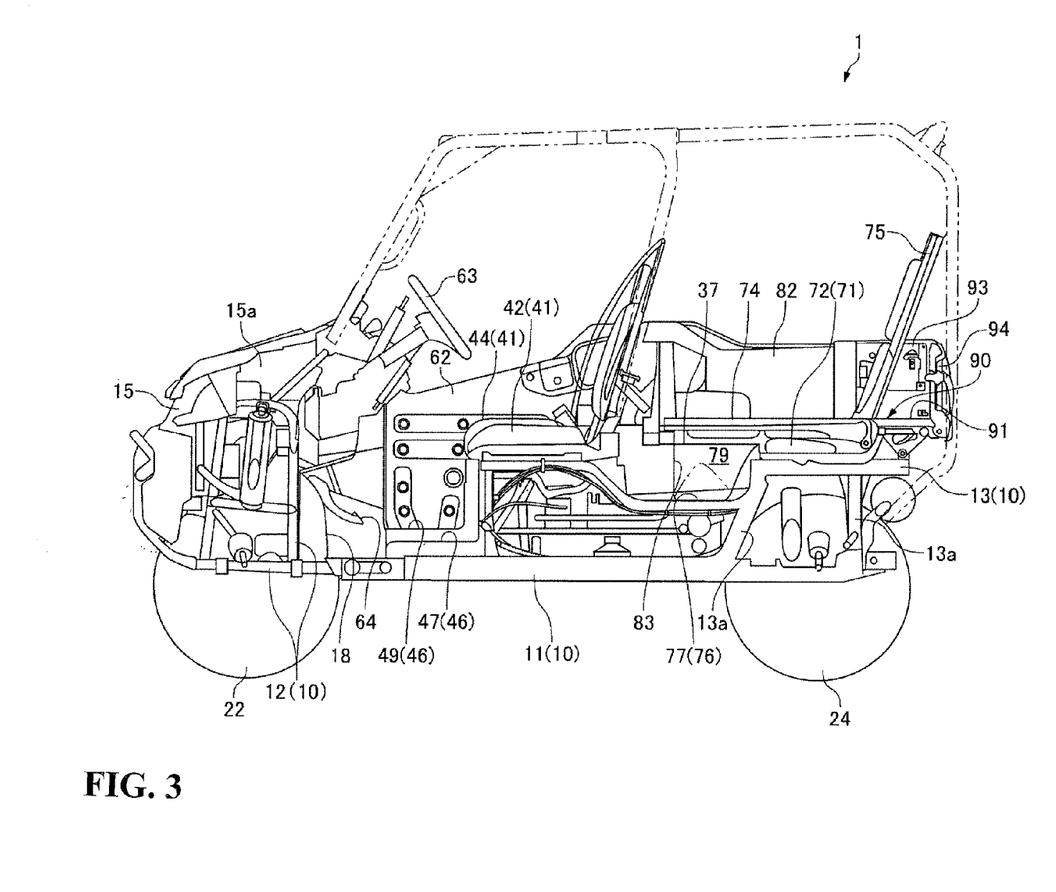
FIG. 3 is a schematic longitudinal sectional side view taken along line III-III of FIG. 1.
Figure 4:
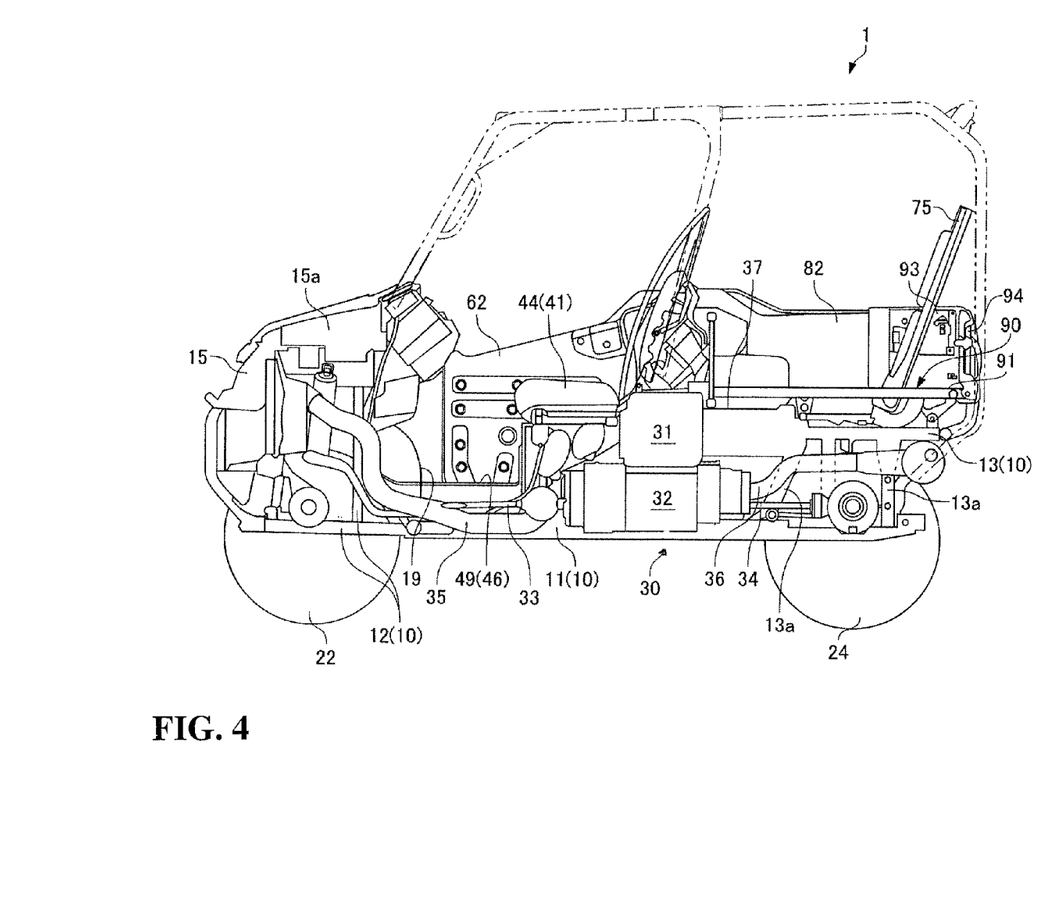
FIG. 4 is a schematic longitudinal sectional side view taken along line IV-IV of FIG. 1.
Figure 5:
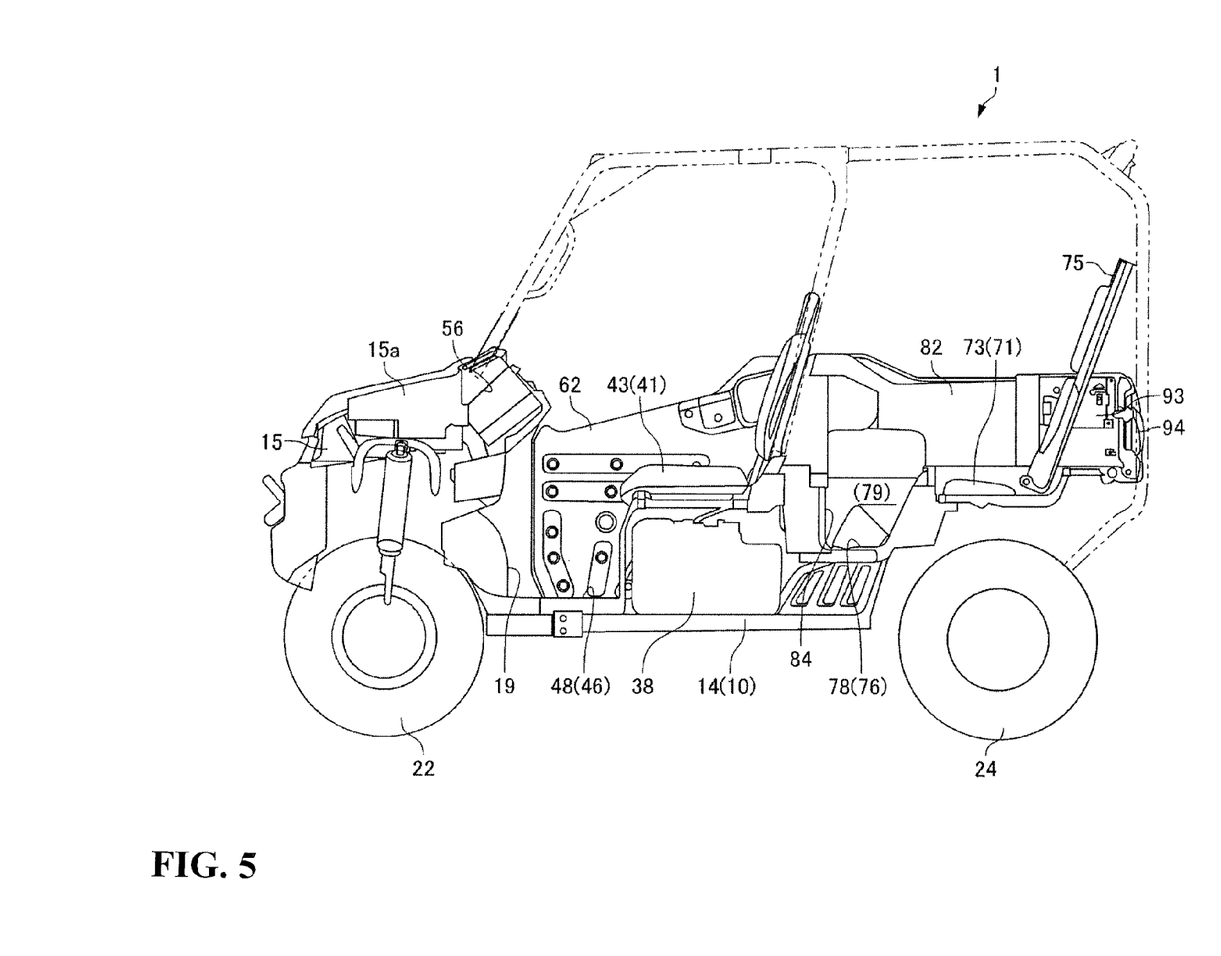
FIG. 5 is a schematic longitudinal sectional side view taken along line V-V of FIG. 1.

The rear-row seats 71 include a left seat 72 and a right seat 73 independent from each other, so that two passengers can be seated side by side in the vehicle width direction. The left seat 72 and the right seat 73 are similar to each other. More specifically, the shape of the back plate (left back plate) 74 of the left seat 72 and the shape of the back plate (right back plate) 75 of the right seat 73 are in left-right symmetry. The left back plate 74 in FIG. 1 is shown in the state of being reclined flat to be utilized as a floor board (left floor board) of the luggage carrier 90. In other words, the left seat 72 in FIG. 1 is in a stored state. The right back plate 75 in FIG. 1 is shown in the state of being erected to be utilized as a backrest for the passenger seated on the right seat 73. In the rear-row seats 71, it is possible for the left back plate 74 and the right back plate 75 to be both erected so that both the left seat 72 and the right seat 73 are used for seating the passengers thereon. In the rear-row seats 71, it is also possible for the left back plate 74 and the right back plate 75 to be both reclined flat (in other words, for the left seat 72 and the right seat 73 to be both stored) so that they are used as floor boards 74 and 75 of the luggage carrier 90.

The height (level) of the seat surfaces of the rear-row seats 71 is approximately equal to the height (level) of the seat surfaces of the front-row seats 41. The left back plate 74 and the right back plate 75 of the rear-row seats 71, when erected, are held in the erected positions by appropriate holding members. Similarly, the left back plate 74 and the right back plate 75 of the rear-row seats 71, when reclined flat, are held in the reclined positions by appropriate holding members.

The rear-row step floor 76 includes a left floor 77 on which the passenger seated on the left seat 72 places his/her feet and a right floor 78 on which the passenger seated on the right seat 73 places his/her feet. The power unit cover 37 is disposed in an area ranging from the right side of the left floor 77 to the left side of the right floor 78. Due to this arrangement, the left floor 77 is disposed on somewhat to the left side relative to the position of the seat surface of the left seat 72. The passenger seated on the left seat 72 can place his/her feet on the left floor 77, while avoiding the power unit cover 37. The right floor 78 is disposed on somewhat the right side relative to the position of the seat surface of the right seat 73. The passenger seated on the right seat 73 can place his/her feet on the right floor 78, while avoiding the power unit cover 37.

In the case where the left back plate 74 and the right back plate 75 of the rear-row seats 71 are reclined flat to be utilized as the floor boards 74 and 75 of the luggage carrier 90, the space on the upper side of the rear-row step floor 76 is covered with the floor boards 74 and 75. In this instance, the space on the upper side of the rear-row step floor 76 can be utilized as a rear storage area 79. The level of the top surface of the power unit cover 37 is lower than the level of the seat surfaces of the rear-row seats 71. Therefore, the rear storage area 79 is configured in an integral form in the space on the upper side of the rear-row step floor 76. More specifically, the rear storage area 79 is composed of the space on the upper side of the left floor 77, the space on the upper side of the right floor 78 and the space formed between the lower surfaces of the floor boards 74 and 75 of the luggage carrier 90 and the top surface of the power unit cover 37.

The left rear door 81 and the right rear door 82 are supported in the state of being hinged at the rear side thereof to a left corner wall 92 and a right corner wall 93, which will be described later, of the luggage carrier 90. At their front lower side, the left rear door 81 and the right rear door 82 cover respectively the left side and the right side of the space on the upper side of the rear-row step floor 76. The level of the upper ends of the left rear door 81 and the right rear door 82 is higher than the level of the upper surfaces of the floor boards 74 and 75 of the luggage carrier 90. Therefore, at their upper side, the left rear door 81 and the right rear door 82 cover the left side and the right side of the rear-row riding space 70 above the floor boards 74 and 75 of the luggage carrier 90. The left rear door 81 is provided with a left recess 83 recessed toward the outer side (left side), at a position where it covers the left side of the space on the upper side of the left floor 77. The right rear door 82 is provided with a recess 84 recessed toward the outer side (right side), at a position where it covers the right side of the space on the upper side of the right floor 78.

The luggage carrier 90 is defined by the floor boards 74 and 75, an auxiliary floor 91 provided rearwardly of the floor boards 74 and 75 at the same level as the floor boards 74 and 75, the left corner wall 92 and the right corner wall 93 rising from the auxiliary floor 91 at left and right corner portions of the auxiliary floor 91, the left rear door 81 and the right rear door 82 and a back door 94. The luggage carrier 90 is partly in a combined-use relation with the rear-row riding space 70.

The auxiliary floor 91 is disposed rearwardly of the rear-row seats 71 at substantially the same height of the floor boards 74 and 75 of the luggage carrier 90, in the state of being supported by the rear frame 13. The left corner wall 92 is supported in the state of rising from the auxiliary floor 91 at the left corner portion of the auxiliary floor 91. The left rear door 81 is supported by being hinged to the left corner wall 92 at the rear side thereof. The right corner wall 93 is supported in the state of rising from the auxiliary floor 91 at the right corner portion of the auxiliary floor 91. The right rear door 82 is supported by being hinged to the right corner wall 93 at the rear side thereof. The back door 94 is supported between the left corner wall 92 and the right corner wall 93, by being hinged to the left corner wall 92 and the right corner wall 93 at the lower side thereof.

The operation of the cabin space structure of the all terrain vehicle 1 will be described below.

In the front-row riding space 40, the center seat 44 of the front-row seats 41 is disposed on the front side as compared with the left seat 42 and the right seat 43, in view of the longitudinal-directional position of the center seat 44 that is determined based on the correlation thereof with the power unit 30 and the longitudinal-directional positions of the left seat 42 and the right seat 43 that are determined based on the correlations thereof with the left wheel well 18 and the right wheel well 19.

Correspondingly to this arrangement, the central portion 54 of the dashboard 51 is disposed at a deeper position (farther position), as viewed from the passengers, as compared with the left portion 52 and the right portion 53 of the dashboard 51. In other words, the spacing from the passengers seated on the left seat 42 and the right seat 43 of the front-row seats 41 to the left portion 52 and the right portion 53 of the dashboard 51 is substantially equal to the spacing from the passenger seated on the center seat 44 of the front-row seats 41 to the central portion 54 of the dashboard 51.

Therefore, the passengers seated on the left seat 42 and the right seat 43 of the front-row seats 41 are restricted by the left portion 52 and the right portion 53 of the dashboard 51, and the passenger seated on the center seat 44 of the front-row seats 41 by the central portion 54 of the dashboard 51, with respect to a forward movement.

More particularly, since the left wheel well 18 and the right wheel well 19 are projecting over the left floor 47 and the right floor 48, the passengers seated on the left seat 42 and the right seat 43 of the front-row seats 41 feel cramped in narrow room around their feet, as compared with the passenger seated on the center seat 44 of the front-row seats 41. Therefore, in the case where the vehicle 1 is travelling on a rough ground, it would be more difficult for the passengers putting their feet on the left floor 47 and the right floor 48 to keep their footing than for the passenger putting his/her feet on the central floor 49. However, the left portion 52 and the right portion 53 of the dashboard 51 ensure that even the passengers putting their feet on the left floor 47 and the right floor 48 are restricted with respect to a forward movement, in quite the same manner as the passenger putting his/her feet on the central floor 49.

According to this embodiment of the present invention, the following effects are produced.

(1) The passenger seated on the left seat 42 where the left wheel well 18 projects over the left floor 47 and the passenger seated on the right seat 43 where the right wheel well 19 projects over the right floor 48 place their feet on their side on the left floor 47 and the right floor 48, avoiding the left wheel well 18 and the right wheel well 19, respectively. In view of this, the left portion 52 and the right portion 53 of the dashboard 51 are disposed on the rear side (passengers' side) relative to the central portion 54. This ensures that the upper parts of the bodies of the passengers are restrained from falling forward. Thus, even when the passengers cannot bring their feet forward, their upper bodies are also restrained from moving forward. Consequently, a comfortable ride can be realized.

(2) The left portion 52 and the right portion 53 of the dashboard 51 are disposed on the rear side relative to the rear portions of the left wheel well 18 and the right wheel well 19. This ensures that the forward falling of the upper bodies of the passengers seated on the left seat 42 and the right seat 43 is restrained more favorably. As a result, a better ride comfort can be obtained.

(3) The central floor 49 corresponding to the center seat 44 is set at a higher level than the left floor 47 and the right floor 48 corresponding to the left seat 42 and the right seat 43, and the intake passage 35 is provided inside the central floor 49. This provides good comfort for the legs of the passenger seated on the center seat 44, while securing the space for the intake passage 35. In addition, in a two-passenger mode wherein the passengers are seated only on the left seat 42 and the right seat 43, a comfortable ride can be secured, since the left floor 47 and the right floor 48 are partitioned from each other by the central floor 49.

(4) The pedal 64 for the driving operation is disposed between the left wheel well 18 or the right wheel well 19 and the central floor 49, on a lateral side of the left wheel well 18 (in the case of left-hand drive) or the right wheel well 19 (in the case of right-hand drive). This ensures that the place on which to place the feet of the passenger (driver) seated on the driver's seat 42 (in the case of left-hand drive) or 43 (in the case of right-hand drive) and the place on which to position the feet of the passenger seated on the center seat 44 can be shifted from each other in the height direction. Consequently, it is possible to secure dwelling spaces for the legs of both of these passengers.

(5) The storage box 56 with the open/close lid 55 is provided at the left portion 52 (in the case of right-hand drive) or the right portion 53 (in the case of left-hand drive) of the dashboard 51. This enables a large-sized storage box 56 to be provided at the left portion 52 (in the case of right-hand drive) or the right portion 53 (in the case of left-hand drive) which is disposed on the rear side relative to the central portion 54 of the dashboard 51.

In the above-described embodiment, the rear-row seats 71 have been composed of the left seat 72 and the right seat 73 independent from each other so that two passengers can be seated side by side in the vehicle width direction. However, the present invention is not restricted to this configuration. For instance, the rear-row seats 71 may be composed of three seats so that three passengers can be seated side by side in the vehicle width direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A cabin space structure for an all terrain vehicle, the all terrain vehicle having left and right front wheels and seats disposed rearwardly of the front wheels for seating passengers thereon, the cabin space structure comprising:
    seats for positioning three passengers side by side in a vehicle width direction;
    a step floor for placing the seated passenger's feet;
    wheel wells for the left and right front wheels, the wheel wells provided to project rearwardly at a left-side portion and a right-side portion of the step floor;
    a dashboard disposed forwardly of the seats, the dashboard being adapted to restrict forward movement of the passengers seated on the seats;
    wherein a left-side portion and a right-side portion of the dashboard are disposed on a rear side relative to a vehicle-width-directionally central portion of the dashboard and a central floor of the step floor that corresponds to a center seat located in a vehicle-width-directional center of the seats, is disposed to be higher than left and right floors of the step floor, the central floor being provided therein with an intake passage; and
    the center seat is disposed to be higher than left and right seats of the seats.

2. The cabin space structure for the all terrain vehicle according to claim 1, wherein the left-side portion and the right-side portion of the dashboard are disposed on the rear side relative to rear portions of the wheel wells.

3. The cabin space structure for the all terrain vehicle according to claim 1, and further comprising:
    a pedal for a driving operation;
    wherein the pedal is disposed between the wheel wells and the central floor of the step floor, on a lateral side of the wheel wells.

4. The cabin space structure for the all terrain vehicle according to claim 1, and further including a storage box with an open/close lid is provided at the left-side portion or the right-side portion of the dashboard.

5. A cabin space structure for an all terrain vehicle comprising:
    a seat for positioning three passengers side by side in a vehicle width direction;
    a step floor for placing the seated passenger's feet;
    wheel wells for left and right front wheels, the wheel wells provided to project rearwardly at a left-side portion and a right-side portion of the step floor;
    a dashboard disposed forwardly of the seat, the dashboard being adapted to restrict forward movement of the passengers positioned on the seat;
    wherein a left-side portion and a right-side portion of the dashboard are disposed on a rear side relative to a vehicle-width-directionally central portion of the dashboard and a central floor of the step floor that corresponds to a center seat located in a vehicle-width-directional center of the seat, is disposed to be higher than left and right floors of the step floor, the central floor being provided therein with an intake passage; and
    the center seat is disposed to be higher than left and right seats of the seat.

6. The cabin space structure for the all terrain vehicle according to claim 5, wherein the left-side portion and the right-side portion of the dashboard are disposed on the rear side relative to rear portions of the wheel wells.

7. The cabin space structure for the all terrain vehicle according to claim 5, and further comprising:
    a pedal for a driving operation;
    wherein the pedal is disposed between the wheel wells and the central floor of the step floor, on a lateral side of the wheel wells.

8. The cabin space structure for the all terrain vehicle according to claim 5, and further including a storage box with an open/close lid is provided at the left-side portion or the right-side portion of the dashboard.

9. A cabin space structure for an all terrain vehicle comprising:
    a seat for positioning three passengers side by side in a vehicle width direction;
    wheel wells for left and right front wheels, the wheel wells provided to project rearwardly at a left-side portion and a right-side portion of a step floor;
    a dashboard disposed forwardly of the seat for restricting forward movement of the passengers positioned on the seat, a left-side portion and a right-side portion of the dashboard being disposed on a rear side relative to a vehicle-width-directionally central portion of the dashboard;
    a storage box with an open/close lid mounted at the left-side portion or the right-side portion of the dashboard;
    wherein a central floor of the step floor that corresponds to a center seat located in a vehicle-width-directional center of the seat, is disposed to be higher than left and right floors of the step floor, the central floor being provided therein with an intake passage; and
    the center seat is disposed to be higher than left and right seats of the seat.

10. The cabin space structure for the all terrain vehicle according to claim 9, wherein the left-side portion and the right-side portion of the dashboard are disposed on the rear side relative to rear portions of the wheel wells.

11. The cabin space structure for the all terrain vehicle according to claim 9, and further comprising:
    a pedal for a driving operation;
    wherein the pedal is disposed between the wheel wells and the central floor of the step floor, on a lateral side of the wheel wells.

* * * * *